United States Patent Office 2,942,000
Patented June 21, 1960

2,942,000
DERIVATIVE OF THEOPHYLLINE-7-ACETIC ACID

Maurice Mizier, Poissy, France, assignor to Laboratoires Delagrange Societe d'Applications Pharmacodynamiques, Paris, France, a corporation of France No Drawing. Filed Dec. 30, 1958, Ser. No. 783,728

Claims priority, application France Mar. 22, 1958

4 Claims. (Cl. 260—253)

The present invention relates to a new anti-naupathic product, and more particularly to a new compound of theophylline-7-acetic acid and diphenhydramine.

The anti-naupathic properties of the theophylline-7-acetate of diphenhydramine are already known. However, the production of this salt in the crystallised state, and its satisfactory conservation in the dry state present serious difficulties.

An object of the invention is to produce an anti-naupathic compound of theophylline-7-acetic acid and diphenhydramine which crystallises readily and keeps in the dry state without modification, for long periods.

A further object of the invention is to produce an anti-naupathic compound of theophylline-7-acetic acid and diphenhydramine, which is capable of being readily brought into the form of tablets.

Still a further object of the invention is to provide a method of preparation of a compound of the kind referred to, in the crystallised form.

It has been found, in a surprising manner, that it was possible to prepare a combination of two molecules of theophylline-7-acetic acid with one molecule of diphenhydramine base, having the same biological properties, that is to say the same experimental anti-naupathic properties as the normal theophylline-acetate of diphenhydramine, and having at the same time a high aptitude for crystallisation and an excellent stability in the dry state, and which is perfectly well adapted for the preparation of tablets.

This combination, which will hereinafter be known as bi-theophylline-7-acetate of diphenhydramine:

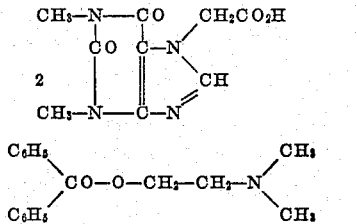

is very probably a crystalline association between one molecule of normal theophylline-acetate of diphenhydramine and one molecule of theophylline-acetic acid. It is decomposed by water into these elements, the acid remaining insoluble and the theophylline-acetate being dissolved.

In accordance with the invention, the said compound is obtained by reacting two molecules of theophylline-7-acetic acid with about one molecule of diphenhydramine base in a medium which does not dissolve either the said acid or its normal salt of diphenhydramine, after which the crystallised product of the reaction is separated.

As a non-solvent medium, there can be employed for example, benzene, toluene, xylene, isopropyl alcohol, ethyl alcohol, ethyl acetate or acetone, without this list being considered as limitative, since other non-solvents may be readily chosen by making previous tests.

In practice, there is an advantage in employing a slight excess of diphenhydramine base with respect to the quantity corresponding to one molecule of base for two molecules of acid. The reaction is preferably carried out by stirring, at a moderate temperature of the order of 40 to 45° C., theophylline-7-acetic acid into the non-solvent medium containing the diphenhydramine base, and adding during the reaction a small quantity of water, of the order of 1 to 2% by volume of the non-solvent medium, in order to displace the equilibrium in the direction of the desired reaction.

The following examples serve to illustrate the invention but are not given as limitative.

*Example I*

A suspension of 95 grams of theophylline-7-acetic acid, finely powdered, was stirred for four hours at a moderate temperature (40–45° C.) in 250 cu. cm. of xylene containing in solution 53 grams of diphenhydramine base. 2.5 cu. cm. of water was then added, and stirring was continued for two hours, this operation being intended to completely displace the existing balances in the desired direction.

By simple filtration in the cold state, there was recovered 143 to 144 grams of crystallised bi-theophylline-7-acetate of diphenhydramine, melting at 168–170° C.

The product obtained was put into the form of tablets by the usual methods, and had not undergone any change at the end of a storage period of six months.

*Example II*

Example I was repeated, but the xylene was replaced by the same quantity of isopropyl alcohol. The same results were obtained as for Example I.

*Example III*

A suspension of 119 grams of finely powdered theophylline-7-acetic acid was stirred for four hours at 40 to 45° C. in 250 cu. cm. of acetone containing in solution 74 grams of diphenhydramine base. 2 cu. cm. of water was then added, the solution was again stirred for two hours, after which a further 2 cu. cm. of water was added and the stirring was again continued for two hours more.

There was thus obtaind 173 grams of crystallised bi-theophylline-7-acetate of diphenhydramine.

What I claim is:

1. The compound bi-theophylline-7-acetate of diphenhydramine corresponding to the following formula:

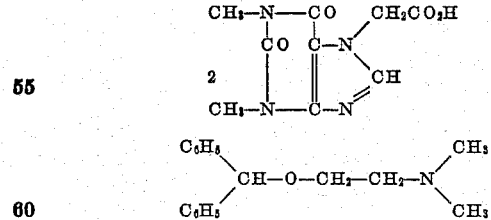

2. A method for preparing di-theophylline-7-acetate of diphenhydramine, comprising intimately mixing and dispersing theophylline-7-acetic acid and diphenhydramine respectively in a molar ratio of about 2:1 into an inert organic liquid reaction medium in which the theophylline-7-acetic acid and diphenhydramine is not soluble and crystallizing out the di-theophylline-7-acetate of diphenhydramine.

3. A method for preparing di-theophylline-7-acetate of diphenhydramine, comprising intimately mixing and dispersing theophylline-7-acetic acid and diphenhydramine respectively in a molar ratio of about 2:1 into an inert organic solvent selected from the group consisting of benzene, toluene, xylene, isopropanol, ethanol, ethyl acetate and acetone and crystallizing out the di-theophylline-7-acetate of diphenhydramine.

4. A process for preparing di-theophylline-7-acetate of diphenhydramine, which comprises reacting theophylline-7-acetic acid and diphenhydramine respectively in a molar ratio of about 2:1 by intimately mixing and dispersing theophylline-7-acetic acid and diphenhydramine respectively in a molar ratio of about 2:1 into an inert organic liquid reaction medium in which both theophylline-7-acetic acid and mono-theophylline-7-acetate of diphenhydramine are insoluble, adding water to said reaction medium to induce crystallization, and crystallizing out the reaction product.

References Cited in the file of this patent

UNITED STATES PATENTS 2,703,803     Raymond et al.  _____ Mar. 8, 1955